United States Patent
Buhl et al.

(10) Patent No.: US 7,505,861 B2
(45) Date of Patent: Mar. 17, 2009

(54) METHOD FOR MONITORING THE INSTALLATION OF A MEASUREMENT DEVICE

(75) Inventors: Frank Buhl, Rosdorf (DE); Jorg Herwig, Kandern (DE); Axel Papenbrock, Gottingen (DE); Peter Riegler, Gottingen (DE); Axel Rossberg, Freiburg (DE); Jens Timmer, Freiburg (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/520,564

(22) PCT Filed: Jun. 17, 2003

(86) PCT No.: PCT/EP03/06367

§ 371 (c)(1),
(2), (4) Date: Sep. 29, 2005

(87) PCT Pub. No.: WO2004/006199

PCT Pub. Date: Jan. 15, 2004

(65) Prior Publication Data

US 2006/0155515 A1    Jul. 13, 2006

(30) Foreign Application Priority Data

Jul. 8, 2002    (DE)    ............... 102 30 607

(51) Int. Cl.
*G01C 25/00*    (2006.01)
(52) U.S. Cl. ............... 702/116; 702/90; 702/185; 73/129; 165/47

(58) Field of Classification Search ............... 702/90, 702/100, 116, 185; 73/37, 700, 129; 165/47; 60/775, 39.53; 384/36
See application file for complete search history.

(56) References Cited

U.S. PATENT DOCUMENTS

| 4,478,713 | A | * | 10/1984 | Girot et al. | ............... 210/101 |
| 5,305,235 | A | * | 4/1994 | Izui et al. | ............... 702/185 |
| 5,757,672 | A | * | 5/1998 | Hoepken | ............... 702/116 |
| 6,429,642 | B1 | * | 8/2002 | Rodilla Sala | ............... 324/142 |
| 6,539,313 | B1 | * | 3/2003 | Bornemann et al. | ............... 702/33 |

OTHER PUBLICATIONS

Zaretskii et al., 'Installation with a Set of Reference Electromagnetic Flowmeters', 1981, PPC Publication, pp. 1100-1103.*
Thomas et al., Installation of Power Monitoring System in a Large, Multiple Power Source, Industrial Facility, 1995, IEEE Publication, pp. 35-53.*

(Continued)

*Primary Examiner*—Edward Raymond
*Assistant Examiner*—Elias Desta
(74) *Attorney, Agent, or Firm*—Michael M. Rickin; Michael C. Prewitt

(57) ABSTRACT

The invention relates to a method for monitoring a measurement device, in particular a flow measurement device, and to a measurement device itself. In order in this case to reliably preclude measurement errors resulting from incorrect installation, the invention proposes that a characteristic variable is calculated from a time series s(t) of the measurement signal of a measurement device and is compared with previously recorded reference values, with this being used as the basis to automatically generate a message as to whether the measurement device has been installed correctly or incorrectly.

17 Claims, 1 Drawing Sheet

OTHER PUBLICATIONS

Yeh et al., 'Ultrasonic Technology: Prospects for Improving Flow Measurements and Standards', 2000, NIS Publication, pp. 1-12.*

Shearer et al., 'Elements of Precision Agriculture: Basics of Yield Monitor Installation and Operation', 2000, UK Publication, pp. 1-10.*

Lynch et al., 'The Development of a Wireless Modular Health Monitoring System for Civil Sturctures', Nov. 2000, Advanced Technologies', pp. 1-4.*

* cited by examiner

METHOD FOR MONITORING THE INSTALLATION OF A MEASUREMENT DEVICE

BACKGROUND OF THE INVENTION

The invention relates to a method for monitoring a measurement device, in particular a flow measurement device, and to a measurement device itself.

Measurement device monitoring systems are widely known. This applies in particular to test equipment which is connected to a bus system via which measurement data is transported in one direction and control data is transported in another direction.

The invention relates in particular to flow measurement devices, in which case a control procedure such as this can also be applied to other measurement devices, provided that these measurement devices determine measurement data from analysis or from a process.

In the case of flow measurement devices, a distinction is drawn between different measurement effects or principles. For example, some measurement devices determine the flow of a fluid capacitively, magnetically or by vortex formation on a flow body. Devices which use the last-mentioned measurement method are referred to as vortex flow measurement devices.

Test equipment such as this determines the flow velocity in a pipeline in a know manner on the basis of the Karman vortex street: a flow obstruction in the pipeline segment of the test equipment produces periodic vortices downstream, whose frequency is a measure of the flow velocity. The vortex signal is converted by suitably tapping off the periodic vortices (for example by means of a paddle or an ultrasound sensor) to an electrical signal whose frequency is a measure of the flow velocity.

Owing to their method of operation, the reliability of such vortex flow measurement devices is highly dependent on the physical state of the fluid. For example:

a tilted installation of the test equipment,
curves in the pipeline,
a pulsating fluid flow,
vibration of the pipelines and
turbulence upstream of the flow obstruction influence the measurement accuracy and the reliability of this test equipment. Installation instructions which are intended to ensure correct use of the vortex flow measurement devices have admittedly been written. However, even when the installation instructions are complied with, there is no guarantee of the reliability not being influenced by effects such as these. Furthermore, even for experienced specialists, it is sometimes difficult to identify the presence of disturbing effects. For example, even relatively minor tilt angles in the installation lead to addition vortex formation in the fluid, with these vortices being superimposed on the actual, desired measurement signal, and influencing the measurement accuracy.

The invention is thus based on the object of specifying a method as well as a measurement device itself by means of which measurement errors such as these resulting from incorrect installation are reliably avoided.

SUMMARY OF THE INVENTION

The essence of the invention with regards to the method is that a characteristic variable is calculated from a time series $s(t)$ of the measurement signal of a measurement device and is compared with previously recorded reference values, with this being used as the basis to automatically generate a message as to whether the measurement device has been installed correctly or incorrectly.

In one advantageous refinement of the invention, the reference values relating to the respective measurement device are recorded in advance and are associated appropriately on a device-related basis. When a number of such measurement devices are being operated, it is thus also possible to reliably associate the reference values with the respectively associated measurement device.

A further advantageous refinement of the invention states that the installation standard determined by comparison is produced automatically as a message and is indicated on the measuring device. This results in a message about correct installation, or if appropriate incorrect installation as well, being indicated automatically to the operator.

A further advantageous refinement states that the installation standard determined by comparison is produced automatically as a message and is transmitted by means of information transmission to a higher-level system where it is indicated. The installation errors, if appropriate, can thus be indicated at a control station. These errors are then indicated in such a way that the relevant appliance is located, and the installation error can be rectified.

One advantageous refinement additionally states that one or more measurement devices which operates or operate in this way is or are connected for information purposes via a bus system to the higher-level system. This results in a suitable information connection between all the connected measurement devices and test equipment.

One advantageous refinement furthermore states that the message is generated automatically as a full text message. A reliable and comprehensible message is thus transmitted to possibly untrained personnel, and will be comprehensible to them.

A final advantageous refinement states that the message is used to automatically generate a corresponding additional full text message with fault rectification instructions. This makes the maintenance work and the rectification of the installation error particularly simple.

With regard to the measurement device itself, the essence of the invention is that a characteristic variable can be calculated in a microprocessor from a time series $s(t)$ of the measurement signal of the measurement device in a calculation unit, and can be compared with previously recorded reference values, which are stored in a data memory, in which case a message can be automatically generated on this basis, as to whether the measurement device has been installed correctly or incorrectly. The information is therefore provided directly and reliably, and in particular completely automatically, about the possible existence of installation errors, so that measurement errors caused by installation errors can be reliably avoided.

One advantageous refinement states that the measurement device has a comparator which compares the time series $s(t)$ of the measurement signal with the data from the data memory. All the preconditions for the equipment to carry out the method according to the invention are thus satisfied.

A further advantageous refinement states that the measurement device contains a display on which said messages can be indicated.

As an alternative to this, it is stated that the display is a display which is arranged remotely from the actual measurement device.

A further advantageous refinement states that the individual elements of the measurement device are accommodated in a compact form in one appliance.

However, as an alternative to this, one advantageous refinement also states that the individual elements of the measurement device are at least partially physically separated, but are connected to one another via an information system.

With regard to the software program product in which the functional features as claimed in one or more of the claims are provided by a software program, and the software program can be implemented in the measurement device, this results in the capability to also implement the function according to the invention retrospectively in an existing system or an existing measurement device.

BRIEF DESCRIPTION OF THE DRAWINGS

The invention is illustrated in the drawing and is described in more detail in the following text.

DETAILED DESCRIPTION OF THE INVENTION

Figure 1:
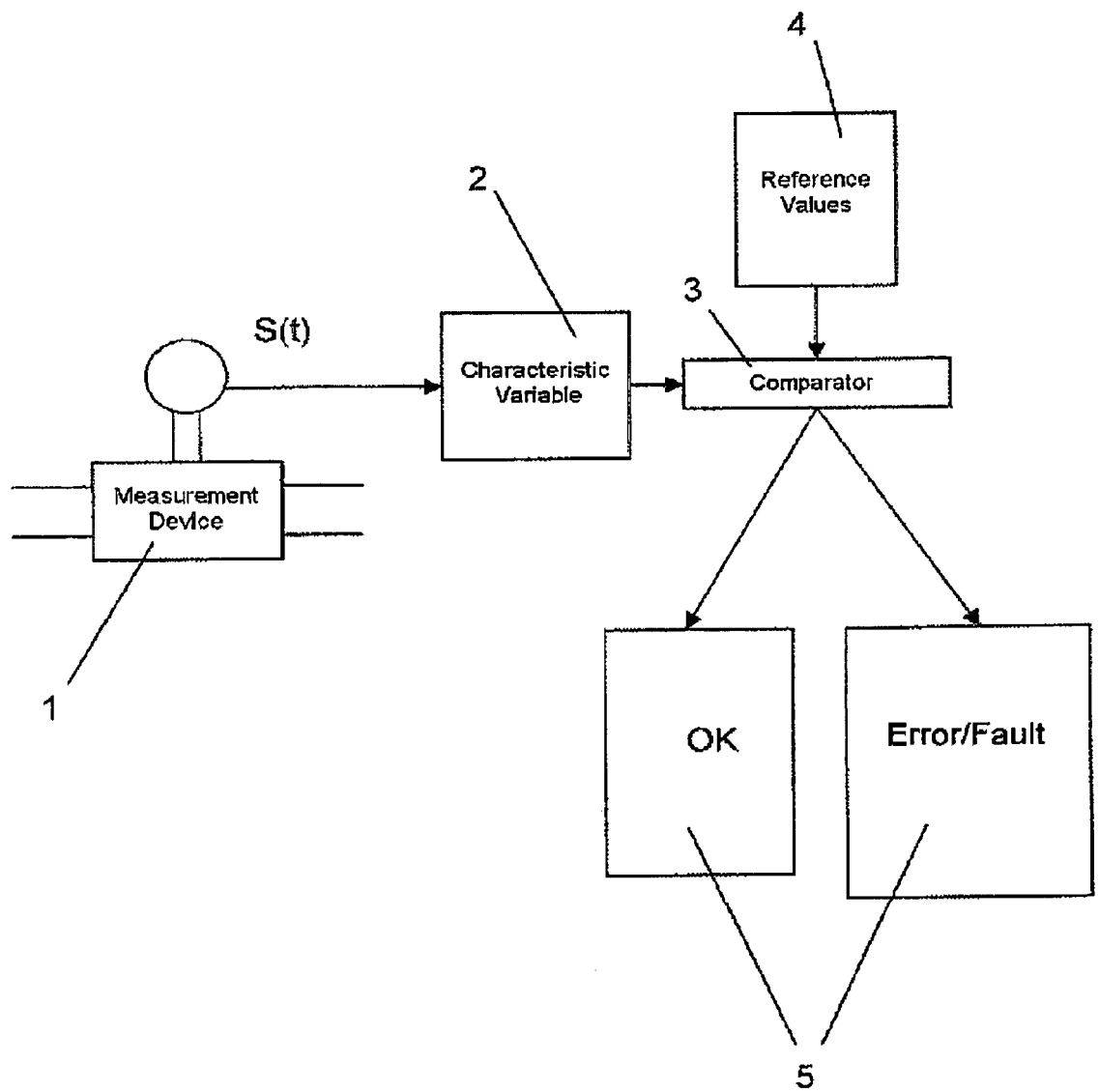
FIG. 1 is a schematic diagram of the method of the present invention.

The apparatus is advantageously in the form of a microprocessor with a memory unit (inter alia for temporary storage of characteristic variables). For processing purposes, the time series s(t) is digitized, unless this has already been done in any case by the measurement converter. The reference values (4) are stored in a database, in one advantageous embodiment.

By way of example, the diffusion constant D of the phase angle $\phi$ of the signal s is suitable for use as the characteristic variable (2). In order to calculate D:

s(t) is converted to the complex signal z(t), z is broken down into its amplitude and phase using $z=|z|\exp(i\phi)$ and D is determined using $D(\tau)=1/\tau\langle[\Delta\phi(t0+\tau)-\Delta\phi(t0)]^2\rangle$ In this case, t0 is the measurement signal start time, $\tau$ is a time delay, $\omega=(d\phi/dt)$, $\Delta\phi=\phi-\omega t$ is the fluctuation of the phase. The symbol $\langle \ldots \rangle$ denotes averaging over t0, based on the use of a suitable number of time series of length T, or a time series is broken down into a suitable number of successive series elements of length T. The interval length T and the delay $\tau$ are chosen in a suitable form. In this case, a ratio $\tau/T<1/2$ is advantageous.

If the characteristic variable is chosen to be $D(\tau)$ then typical values of $D(\tau)$ (possibly together with a fluctuation measure) in disadvantageous installation conditions are then stored as reference values (4). The reference values have been determined experimentally using the described method in specific disadvantageous installation conditions (for example by the manufacturer), and are stored in a nonvolatile memory. They are used as fingerprints: if, by way of example, a characteristic variable $D(\tau)$ which has been determined during operation is comparable with that produced with a tilted installation, then this is identified by the comparator (3) and an appropriate error message is emitted in the form "tilted installation". If, in contrast, the characteristic variable $D(\tau)$ is comparable with the characteristic variable stored for "correct installation", no error message is produced, and the status message "correct installation" is emitted.

The comparator calculates the similarity between the current characteristic variable and the reference values by means of a suitable metric. The mean square distance, the difference or similar variables are suitable for this purpose.

The error message can be emitted via a display on the transmitter or can be transmitted to a downstream system (for example a control station or handheld device) for further processing (for example via a fieldbus or without the use of wires).

What is claimed is:

1. A method for monitoring the installation of a measurement device having a measurement signal comprising:
    calculating from a time series s(t) of said measurement signal a characteristic variable for said measurement device;
    comparing said characteristic variable with previously recorded reference values for said measurement device; and
    using said comparison as the basis to automatically generate a message as to whether said measurement device has been installed according to the manufacturers instructions so as to eliminate disturbing effects.

2. The method of claim 1 where said measurement device is more than one measurement device and said measurement values related to each of said more than one measurement device are recorded in advance and associated on a device related basis to a respective one of said more than one measurement devices.

3. The method of claim 2 further comprising automatically producing from said comparison an installation standard as said message for at least one of said more than one measurement devices and indicating said message on said at least one device.

4. The method of claim 2 further comprising automatically producing from said comparison an installation standard as said message for at least one of said more than one measurement devices and transmitting said message to a higher level system where said message is indicated.

5. The method of claim 2 wherein at least one of said more than one measurement devices are connected to a higher level system by a bus.

6. The method of claim 1 wherein said measurement device is connected to said higher level system by a bus.

7. The method of claim 1 wherein said message is generated automatically as a full text message.

8. A measurement device having a measurement signal comprising:
    a computing device comprising:
    a device for calculating a characteristic variable from a time series of said measurement signal and comparing said characteristic variable with previously recorded reference values for said measurement device; and
    a device for using said comparison as the basis to automatically generate a message as to whether said measurement device has been installed according to the manufacturers instructions so as to eliminate disturbing effects.

9. The measurement device of claim 8 further comprising a comparator for comparing said characteristic variable with previously recorded reference values for said measurement device stored in a data memory.

10. The measurement device of claim 8 further comprising a display on which said message can be indicated.

11. A computer program product for monitoring the installation of a measuring device, said measurement device having a measurement signal, said computer program product comprising:
    a computer readable media having instructions for causing a computer to execute a method comprising:
    calculating from a time series s(t) of said measurement signal a characteristic variable for said measurement device;

comparing said characteristic variable with previously recorded reference values for said measurement device; and using said comparison as the basis to automatically generate a message as to whether said measurement device has been installed according to the manufacturers instructions so as to eliminate disturbing effects.

12. The computer program product of claim 11 wherein measurement device is more than one measurement device and said measurement values related to each of said more than one measurement device are recorded in advance and associated on a device related basis to a respective one of said more than one measurement devices and said instructions for causing a computer to execute a method further comprise automatically producing from said comparison an installation standard as said message for at least one of said more than one measurement devices and indicating said message on said at least one device.

13. The computer program product of claim 11 wherein measurement device is more than one measurement device and said measurement values related to each of said more than one measurement device are recorded in advance and associated on a device related basis to a respective one of said more than one measurement devices and said instructions for causing a computer to execute a method further comprise automatically producing from said comparison an installation standard as said message for at least one of said more than one measurement devices and transmitting said message to a higher level system where said message is indicated.

14. The computer program product of claim 12 wherein said instructions for causing a computer to execute a method further comprise automatically generating said message as a full text message.

15. The method of claim 1 wherein said measurement device is a vortex flow measurement device and said characteristic variable is a diffusion constant of a phase angle $\phi$ of said measurement signal.

16. The measurement device of claim 8 wherein said measurement device is a vortex flow measurement device and said characteristic variable is a diffusion constant of a phase angle $\phi$ of said measurement signal.

17. The computer program product of claim 11 wherein said measurement device is a vortex flow measurement device and said characteristic variable is a diffusion constant of a phase angle $\phi$ of said measurement signal.

* * * * *